US012588058B2

(12) United States Patent
Inoue et al.

(10) Patent No.: US 12,588,058 B2
(45) Date of Patent: Mar. 24, 2026

(54) BASE STATION, BASE STATION SYSTEM, AND COMMUNICATION METHOD

(71) Applicant: NTT, Inc., Tokyo (JP)

(72) Inventors: Yasuhiko Inoue, Musashino (JP); Akira Kishida, Musashino (JP); Kengo Nagata, Musashino (JP); Yusuke Asai, Musashino (JP); Yasushi Takatori, Musashino (JP)

(73) Assignee: NTT, Inc., Tokyo (JP)

( * ) Notice: Subject to any disclaimer, the term of this patent is extended or adjusted under 35 U.S.C. 154(b) by 680 days.

(21) Appl. No.: 17/911,681

(22) PCT Filed: Mar. 17, 2020

(86) PCT No.: PCT/JP2020/011812
§ 371 (c)(1),
(2) Date: Sep. 15, 2022

(87) PCT Pub. No.: WO2021/186584
PCT Pub. Date: Sep. 23, 2021

(65) Prior Publication Data
US 2023/0147391 A1 May 11, 2023

(51) Int. Cl.
*H04W 74/08* (2024.01)
*H04L 1/1607* (2023.01)
*H04W 74/0808* (2024.01)

(52) U.S. Cl.
CPC ....... *H04W 74/0808* (2013.01); *H04L 1/1657* (2013.01)

(58) Field of Classification Search
CPC . H04W 74/0808; H04W 36/02; H04W 36/08; H04W 40/00; H04L 1/1657; H04L 45/66
See application file for complete search history.

(56) References Cited

U.S. PATENT DOCUMENTS

| | | | |
|---|---|---|---|
| 6,757,270 B1 * | 6/2004 | Kumar .................. | H04W 52/12 370/342 |
| 8,953,576 B2 * | 2/2015 | Jonsson .................... | H04L 1/02 455/436 |
| 10,349,320 B2 * | 7/2019 | Nogami ................ | H04W 72/23 |

(Continued)

FOREIGN PATENT DOCUMENTS

| | | |
|---|---|---|
| JP | 2007214974 A | 8/2007 |
| JP | 2019012867 A | 1/2019 |

(Continued)

OTHER PUBLICATIONS

IEEE Std 802. Nov. 2016, "10.22.2 HCF contention based channel access (EDCA)", Dec. 7, 2016.

(Continued)

*Primary Examiner* — Wutchung Chu

(57) ABSTRACT

A base station (20A) that, in a base station system (1) including a first base station (10) and at least two second base stations (20A, 20B), functions as the first base station (10), includes: a MAC processing unit (103) that performs MAC layer processing and generates a first MAC frame used in common between the first base station (10) and the second base station (20A); and a communication processing unit (105A) that transmits the first MAC frame to the second base station (20A).

8 Claims, 12 Drawing Sheets

(56)         References Cited

U.S. PATENT DOCUMENTS

| | | | | |
|---|---|---|---|---|
| 11,546,948 B2 * | 1/2023 | Shah | | H04W 74/006 |
| 2005/0089064 A1 * | 4/2005 | Zimmerman | | H04Q 11/0478 |
| | | | | 370/468 |
| 2007/0202918 A1 * | 8/2007 | Shin | | H04W 24/00 |
| | | | | 455/562.1 |
| 2008/0068979 A1 * | 3/2008 | Visotsky | | H04L 1/1825 |
| | | | | 370/208 |
| 2008/0090575 A1 * | 4/2008 | Barak | | H04W 28/18 |
| | | | | 370/310 |
| 2010/0080121 A1 * | 4/2010 | Shimada | | H04L 1/08 |
| | | | | 370/230 |
| 2011/0096752 A1 * | 4/2011 | Yuk | | H04W 12/062 |
| | | | | 370/331 |
| 2016/0149686 A1 * | 5/2016 | Tsai | | H04L 1/18 |
| | | | | 370/329 |
| 2017/0013482 A1 * | 1/2017 | Tandai | | H04L 5/0048 |
| 2017/0374579 A1 * | 12/2017 | Wang | | H04W 28/0278 |
| 2018/0020396 A1 * | 1/2018 | Yoshimura | | H04W 72/04 |
| 2018/0020428 A1 * | 1/2018 | Madhavan | | H04W 74/0816 |
| 2018/0376350 A1 * | 12/2018 | Tomeba | | H04W 74/0808 |
| 2019/0053278 A1 * | 2/2019 | Kecicioglu | | H04W 74/0808 |
| 2019/0349992 A1 * | 11/2019 | Zhang | | H04L 27/0006 |
| 2020/0077441 A1 * | 3/2020 | Madhavan | | H04L 1/1861 |
| 2020/0252853 A1 * | 8/2020 | Shi | | H04W 40/22 |
| 2020/0366337 A1 * | 11/2020 | Xie | | H04B 7/024 |
| 2020/0404660 A1 * | 12/2020 | Joseph | | H04W 72/23 |
| 2021/0029703 A1 * | 1/2021 | Zhou | | H04L 5/0053 |
| 2021/0044385 A1 * | 2/2021 | Hosseini | | H04L 1/1887 |
| 2021/0067997 A1 * | 3/2021 | Wang | | H04W 88/04 |
| 2021/0076416 A1 * | 3/2021 | Shah | | H04W 74/085 |
| 2023/0033910 A1 * | 2/2023 | Khoshnevisan | | H04L 5/0048 |
| 2023/0057080 A1 * | 2/2023 | Khoshnevisan | | H04L 5/0051 |
| 2023/0164833 A1 * | 5/2023 | Kusashima | | H04W 16/14 |
| | | | | 370/329 |
| 2024/0373214 A1 * | 11/2024 | Elshafie | | H04W 12/041 |

FOREIGN PATENT DOCUMENTS

| | | |
|---|---|---|
| JP | 2019016920 A | 1/2019 |
| JP | 2019110403 A | 7/2019 |
| JP | 2020036206 A | 3/2020 |

OTHER PUBLICATIONS

International Search Report (English and Japanese) and Written Opinion (Japanese) of the ISA issued in PCT/JP2020/011815, mailed Sep. 24, 2020; ISA/JP.

* cited by examiner

BASE STATION, BASE STATION SYSTEM, AND COMMUNICATION METHOD

CROSS-REFERENCE TO RELATED APPLICATIONS

This application is a 371 U.S. National Phase of International Application No. PCT/JP2020/011812 filed on Mar. 17, 2020. The entire disclosures of the above applications are incorporated herein by reference.

TECHNICAL FIELD

Embodiments relate to a base station, a base station system, and a communication method.

BACKGROUND ART

Wireless LAN terminals connect to networks such as the Internet via a base station. When a terminal moves outside the service area of a given base station, the terminal switches the base station to which a connection is to be made. Such switching is called "handover" or the like.

CITATION LIST

Non Patent Literature

NPL 1:IEEE Std 802.11-2016, "10.22.2 HCF contention based channel access (EDCA)", 7 Dec. 2016

SUMMARY OF THE INVENTION

Technical Problem

To perform a handover, a terminal disconnects from the connected base station and re-connects to the next base station. Overhead arises during such base station switches.

Embodiments provide a base station, a base station system, and a communication method capable of suppressing overhead for switching base stations.

Means for Solving the Problem

According to an embodiment, in a base station system including a first base station and at least two second base stations, a base station functions as the first base station. The base station includes a MAC processing unit and a communication processing unit. The MAC processing unit performs MAC layer processing and generates a first MAC frame used in common between the first base station and the second base stations. The communication processing unit transmits the first MAC frame to the second base stations.

Advantageous Effects of the Invention

According to embodiments, a base station, a base station system, and a communication method capable of suppressing overhead for switching base stations can be provided.

DESCRIPTION OF EMBODIMENTS

Figure 1:
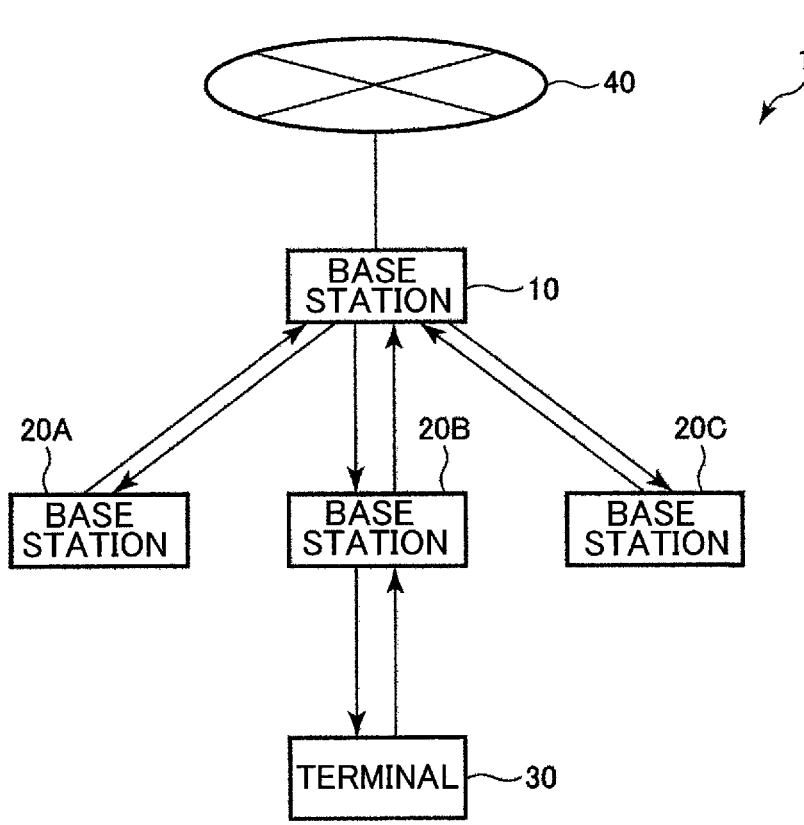
FIG. 1 is a diagram illustrating an example of the configuration of a communication system according to an embodiment.

Embodiments will be described hereinafter on the basis of the drawings. FIG. 1 is a diagram illustrating an example of the configuration of a communication system according to an embodiment. A communication system 1 includes a first base station 10, second base stations 20A, 20B, and 20C, and a terminal 30.

In the embodiment, the first base station 10 and the second base stations 20A, 20B, and 20C function as one access point (AP) for the terminal 30. When communicating with the terminal 30, the second base stations 20A, 20B, and 20C use a MAC address set in a wireless module of the first base station 10 as their own MAC addresses. The first base station 10 is a base station serving as a higher-order AP that centrally manages MAC layer processing of the second base stations 20A, 20B, and 20C. The first base station 10 is configured to be capable of connecting to a network 40. The second base stations 20A, 20B, and 20C are base stations serving as lower-order APs that transmit and receive wireless signals directly to and from the terminal 30. Each of the second base stations 20A, 20B, and 20C is configured to be capable of transmitting and receiving wireless signals to and from the terminal 30 within a predetermined service area. When communicating with the first base station 10, the second base stations 20A, 20B, and 20C may use MAC addresses set individually in the respective wireless modules of the second base stations 20A, 20B, and 20C. Here, the second base stations 20A, 20B, and 20C may be arranged such that overlapping areas are created in the service area, or may be arranged such that no overlapping areas are created. The following descriptions assume that the second base stations 20A, 20B, and 20C are arranged such that overlapping areas are created in the service area. Additionally, three second base stations are illustrated in FIG. 1. It is sufficient for there to be at least one second base station.

Figure 2:
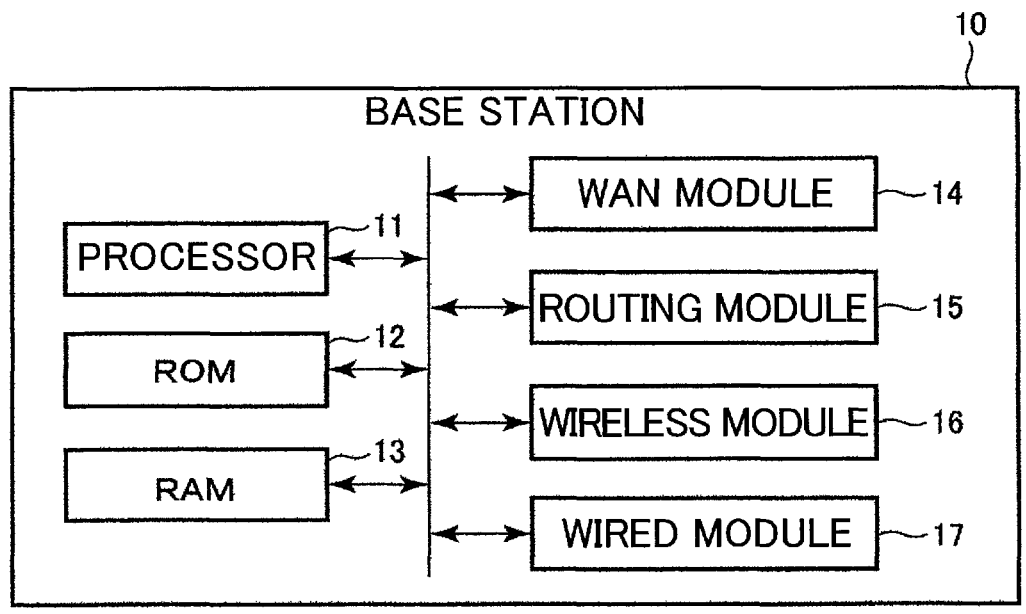
FIG. 2 is a diagram illustrating an example of the hardware configuration of a first base station.

FIG. 2 is a diagram illustrating an example of the hardware configuration of the first base station 10. The first base station 10 includes a processor 11, Read Only Memory (ROM) 12, Random Access Memory (RAM) 13, a Wide Area Network (WAN) module 14, a routing module 15, a wireless module 16, and a wired module 17.

The processor 11 is a processing device that controls the first base station 10 as a whole. The processor 11 is, for example, a Central Processing Unit (CPU). The processor 11 is not limited to a CPU. An Application Specific IC (ASIC) or the like may be used instead of a CPU. There may be two or more processors 11 instead of one.

The ROM 12 is a read-only storage device. The ROM 12 stores firmware, various types of programs, and the like necessary for the first base station 10 to operate.

The RAM 13 is a storage device that can be written to as desired. The RAM 13 is used as a work area for the processor 11, and temporarily stores the firmware and the like held in the ROM 12.

The WAN module 14 is a module including an interface for the first base station 10 to communicate with, for example, a server (not shown) over the network 40. The WAN module 14 is configured to be capable of connecting to the network 40 via an optical line, for example.

The routing module 15 is connected to the WAN module 14, and is configured to route IP packets from the WAN module according to address information thereof. Note that the first base station 10 does not absolutely have to include the routing module 15. The first base station 10 may be configured to access a router provided outside the first base station 10 through wireless communication or wired communication and connect to the network 40 via this router.

The wireless module 16 is a module configured to perform processing necessary for wireless LAN communication. The wireless module 16 generates MAC frames by performing Logical Link Control (LLC) layer and Media Access Control (MAC) layer processing on data transferred from the processor 11, for example. Each MAC frame includes a MAC header, which contains a MAC address used in common by the first base station 10 and the second base stations 20A, 20B, and 20C, a MAC payload containing the data transferred from the processor 11 or the like, and error detection code (FCS). The MAC address used in common is, for example, the MAC address of the first base station 10, which is the higher-order AP. The wireless module 16 extracts data from the MAC frames transmitted from the terminal 30 via any of the second base stations 20A, 20B, and 20C and transfers that data to the processor 11, for example.

The wired module 17 is a module configured to perform processing necessary for wired communication with the second base stations 20A, 20B, and 20C. For example, the wired module 17 is connected to each of the second base stations 20A, 20B, and 20C by a cable. A coaxial cable, Radio on Fiber (ROF), or the like is conceivable as the connection type. As long as the configuration is such that signals transmitted from the wired module 17 are received by the desired base station among the second base stations 20A, 20B, and 20C, and signals transmitted from the second base stations 20A, 20B, and 20C are received by the wired module 17, the wired module 17 may be configured to be capable of communication using any desired wired communication method.

Figure 3:
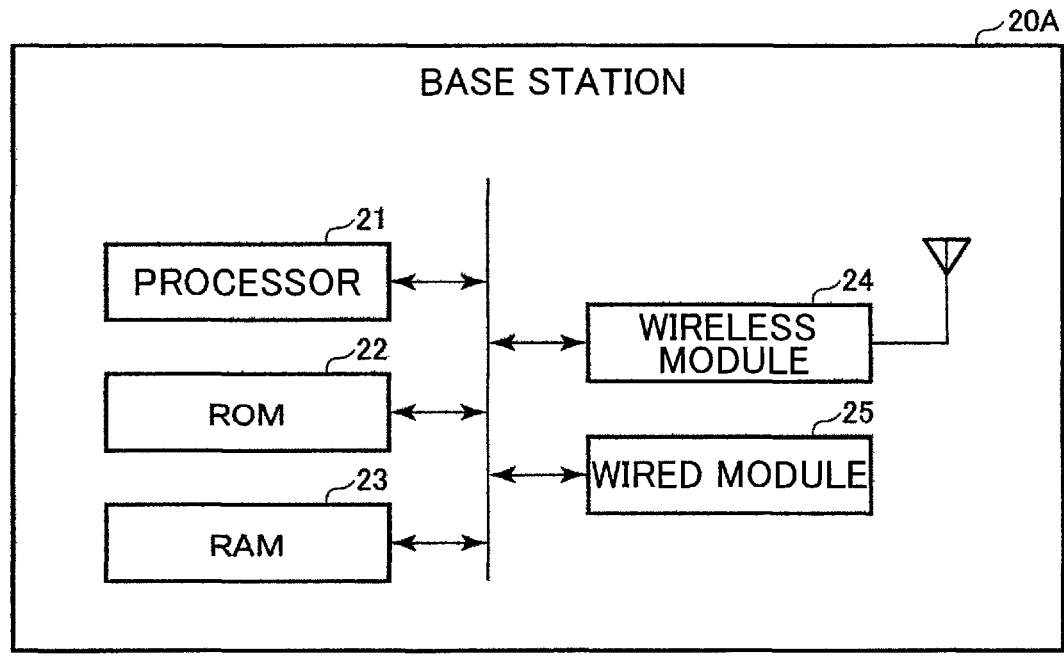
FIG. 3 is a diagram illustrating an example of the hardware configuration of a second base station.

FIG. 3 is a diagram illustrating an example of the hardware configuration of the second base station 20A. The second base stations 20B and 20C may have the same hardware configuration as the second base station 20A. The following assumes that the hardware configurations of the second base stations 20B and 20C are the same as that of the second base station 20A, and thus the hardware configurations of the second base stations 20B and 20C will not be described.

The second base station 20A includes a processor 21, Read Only Memory (ROM) 22, Random Access Memory (RAM) 23, a wireless module 24, and a wired module 25.

The processor 21 is a processing device that controls the second base station 20A as a whole. The processor 21 is, for example, a Central Processing Unit (CPU). The processor 11 is not limited to a CPU. An Application Specific IC (ASIC) or the like may be used instead of a CPU. There may be two or more processors 21 instead of one.

The ROM 22 is a read-only storage device. The ROM 22 stores firmware, various types of programs, and the like necessary for the second base station 20A.

The RAM 23 is a storage device that can be written to as desired. The RAM 23 is used as a work area for the processor 21, and temporarily stores the firmware and the like held in the ROM 22.

The wireless module 24 is a module configured to perform processing necessary for wireless LAN communication. The wireless module 24 performs physical layer processing on MAC frames received from the first base station 10 via the wired module 25 to convert the MAC frames into wireless signals. At this time, the wireless module 24 adds a physical header to the MAC frame. For example, in the IEEE 802.11 frame format, the physical header includes a Physical Layer Convergence Protocol (PLCP) preamble and a PLCP header. The wireless module 24 converts the MAC frame to which the physical header is added into a wireless signal. The wireless module 24 then transmits the wireless signal to the terminal 30. The wireless module 24 also extracts MAC frames from wireless signals received from the terminal 30.

The wired module 25 is a module configured to perform processing necessary for wired communication with the first base station 10. For example, the wired module 25 is connected to the first base station 10 by a cable. A coaxial cable, Radio on Fiber (ROF), or the like is conceivable as the connection type. As long as the configuration is such that signals transmitted from the wired module 25 are received by the first base station 10, and signals transmitted from the first base station 10 are received by the wired module 25, the wired module 25 may be configured to be capable of communication using any desired wired communication method.

Figure 4:
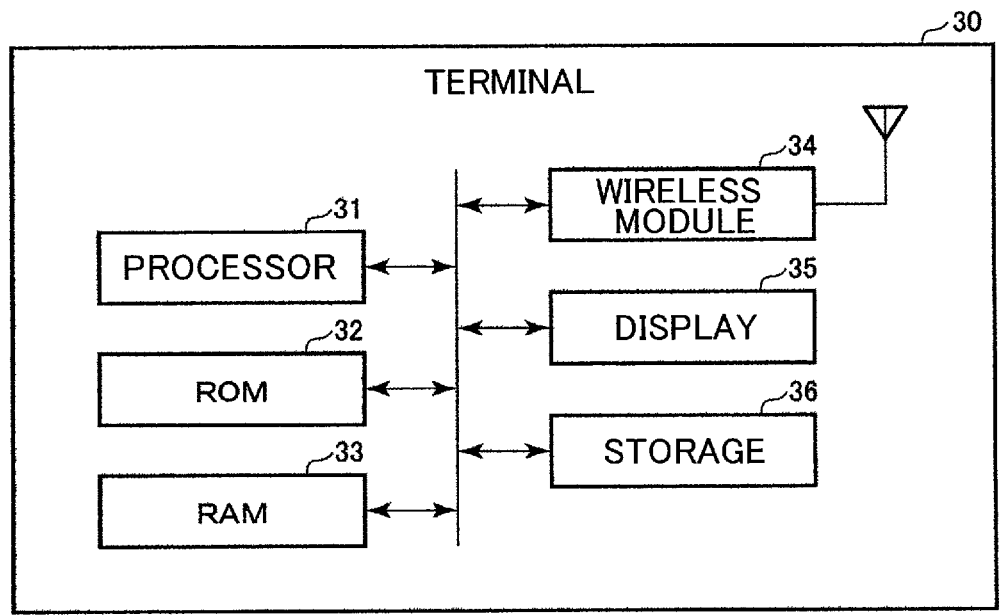
FIG. 4 is a diagram illustrating an example of the hardware configuration of a terminal.

FIG. 4 is a diagram illustrating an example of the hardware configuration of the terminal 30. The terminal 30 is a terminal device (station) such as a smartphone or the like. The terminal 30 may be a mobile terminal, a terminal installed in a moving body, or a fixed terminal.

The terminal 30 includes a processor 31, ROM 32, RAM 33, a wireless module 34, a display 35, and storage 36.

The processor 31 is a processing device that controls the terminal 30 as a whole. The processor 31 is, for example, a CPU. The processor 31 is not limited to a CPU. An ASIC or the like may be used instead of a CPU. There may be two or more processors 31 instead of one.

The ROM 32 is a read-only storage device. The ROM 32 stores firmware, various types of programs, and the like necessary for the terminal 30 to operate.

The RAM 33 is a storage device that can be written to as desired. The RAM 33 is used as a work area for the processor 31, and temporarily stores the firmware and the like held in the ROM 32.

The wireless module 34 is a module configured to perform processing necessary for wireless LAN communication. The wireless module 34 constructs MAC frames for wireless communication by performing MAC layer processing on data transferred from the processor 31, for example, converts the MAC frames into a wireless signal by performing physical layer processing on the constructed MAC frames, and transmits the wireless signal to the first base station 10. As will be described later, the wireless signal destined for the first base station 10 can be received by the second base stations 20A, 20B, and 20C. The wireless module 34 also receives wireless signals from the second base stations 20A, 20B, and 20C, extracts data from the received wireless signals, and transfers the data to the processor 21, for example.

The display 35 is a display device that displays various types of screens. The display 35 may be a liquid crystal display, an organic EL display, or the like. The display 35 may also include a touch panel.

The storage 36 is a storage device such as a hard disk or the like. The storage 36 stores various types of applications executed by the processor 31, for example.

Figure 5:
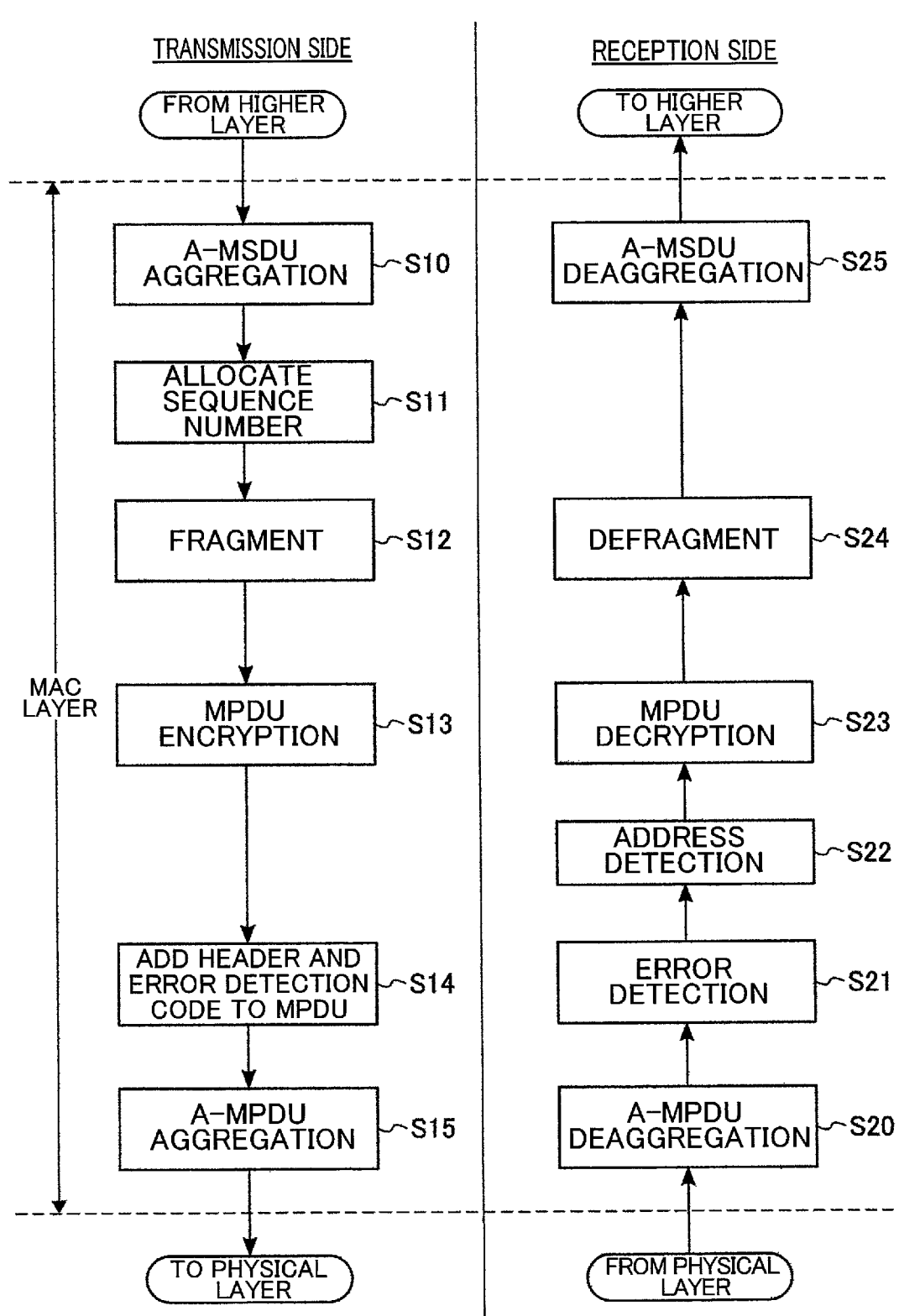
FIG. 5 is a diagram illustrating MAC layer processing during communication between the first base station and second base station and the terminal.

FIG. 5 is a diagram illustrating MAC layer processing during communication between the first base station 10 and second base stations 20A, 20B, and 20C, and the terminal 30. The MAC layer processing in FIG. 5 follows the IEEE 802.11 standard. FIG. 5 illustrates both transmission-side processing and reception-side processing. When the wireless module of one of the first base station 10 and second base stations 20A, 20B, and 20C and the terminal 30 performs the transmission-side processing, the wireless module of the other performs the reception-side processing. In the following example, the transmission-side and reception-side wireless modules will be described without making distinctions between the two.

The transmission-side processing will be described first. In step S10, the wireless module performs A-MSDU aggregation. Specifically, the wireless module concatenates multiple LLC packets input from the LLC layer to generate an Aggregate-MAC service data unit (A-MSDU).

In step S11, the wireless module assigns a sequence number (SN) to the A-MSDU. The sequence number is a unique number for identifying the A-MSDU.

In step S12, the wireless module fragments the A-MSDU into multiple MAC protocol data units (MPDU).

In step S13, the wireless module encrypts each MPDU to generate encrypted MPDUs.

In step S14, the wireless module adds a MAC header and error detection code (FCS) to each encrypted MPDU. The error detection code is, for example, Cyclic Redundancy Check (CRC) code.

In step S15, the wireless module performs A-MPDU aggregation. Specifically, the wireless module concatenates multiple MPDUs to generate an Aggregate-MAC protocol data unit (A-MPDU) as a MAC frame.

After step S15, the wireless module performs physical layer processing on the MAC frame.

In the above-described transmission-side processing, when the transmission side is the first base station 10 and the second base stations 20A, 20B, and 20C, the wireless module 16 of the first base station 10 performs the MAC layer processing from step S11 to step S15. The wireless modules 24 of the second base stations 20A, 20B, and 20C perform the physical layer processing. On the other hand, when the transmission side is the terminal 30, the wireless module 34 of the terminal 30 performs the MAC layer processing from step S10 to step S15 and the physical layer processing.

The reception-side processing will be described next. When a wireless signal is received, the wireless module performs physical layer processing and extracts a MAC frame from the wireless signal. The wireless module then performs the MAC layer processing illustrated in FIG. 5.

In step S20, the wireless module performs A-MPDU deaggregation. Specifically, the wireless module fragments the A-MPDU into units of MPDUs.

In step S21, the wireless module performs error detection. For example, the wireless module performs a CRC to determine whether or not the reception of the wireless signal has succeeded. If the reception of the wireless signal has failed, the wireless module may make a retransmission request. At this time, the wireless module may request the retransmission in units of MPDUs. On the other hand, if the reception of the wireless signal has succeeded, the wireless module performs the next processing.

In step S22, the wireless module performs address detection. At this time, the wireless module determines whether or not the MPDU which has been sent thereto is addressed to that wireless module itself on the basis of the address recorded in the MAC header of each MPDU. If not addressed to that wireless module itself, the wireless module does not perform the next processing. If addressed to that wireless module itself, the wireless module performs the next processing.

In step S23, the wireless module decrypts the encrypted MPDU.

In step S24, the wireless module defragments the MPDUs. In other words, the wireless module reconstructs the A-MSDU from multiple MPDUs.

In step S25, the wireless module performs A-MSDU deaggregation. Specifically, the wireless module reconstructs the LLC packets in units of MPDUs from the A-MSDU.

After step S25, the wireless module outputs the LLC packets to the layer above the MAC layer. The higher layer is the LLC layer, for example.

In the above-described reception-side processing, when the reception side is the first base station 10 and the second base stations 20A, 20B, and 20C, the wireless modules 24 of the second base stations 20A, 20B, and 20C perform the physical layer processing and the MAC layer processing from step S20 to step S22. On the other hand, the wireless module 16 of the first base station 10 performs the MAC layer processing from step S23 to step S25. On the other hand, when the reception side is the terminal 30, the wireless module 34 of the terminal 30 performs the physical layer processing and the MAC layer processing from step S20 to step S25.

Figure 6:
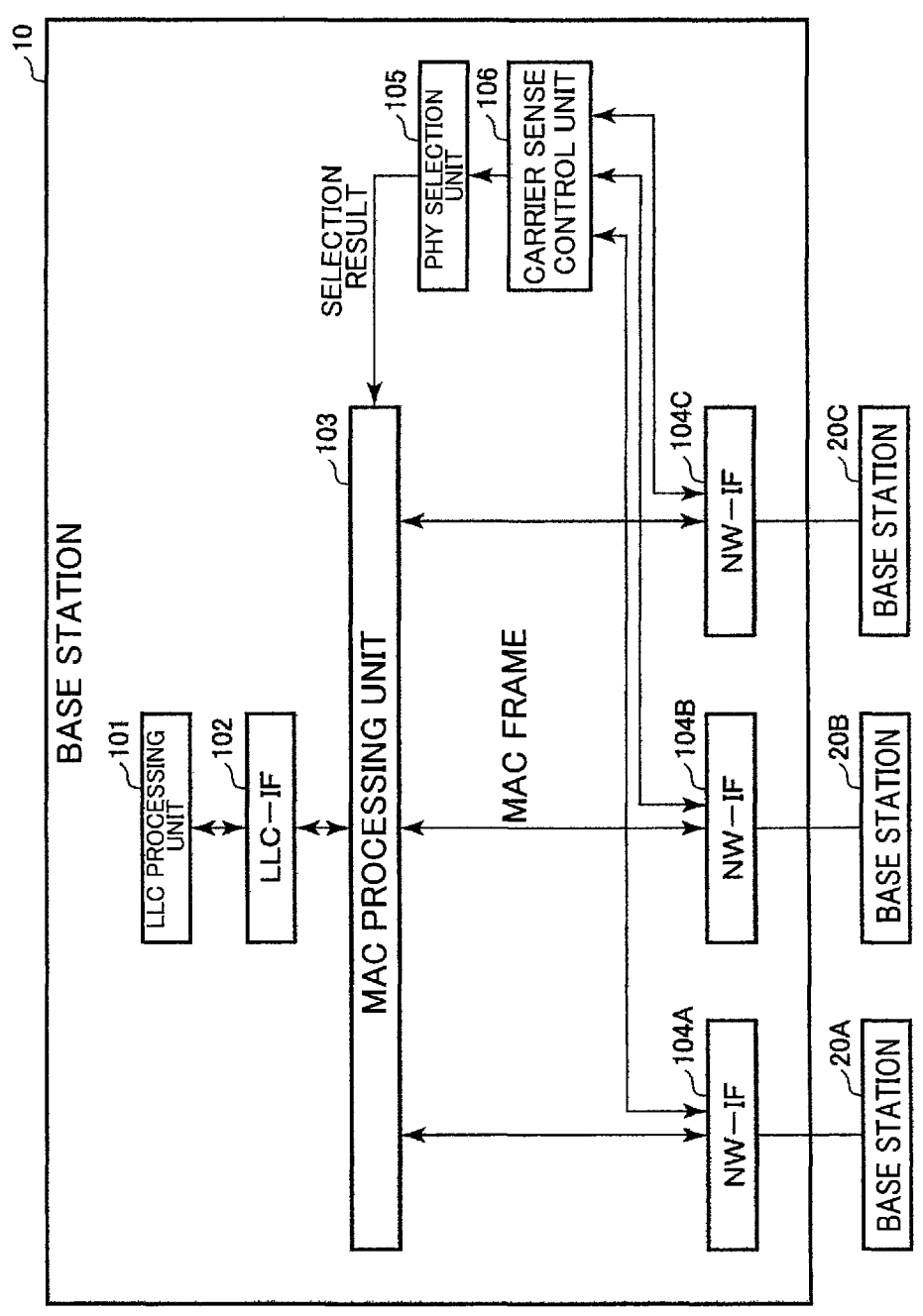
FIG. 6 is a function block diagram of the first base station.

FIG. 6 is a function block diagram of the first base station 10. The first base station 10 includes an LLC processing unit 101, an LLC interface (LLC-IF) 102, a MAC processing unit 103, network interfaces (NW-IF) 104A, 104B, and 104C, a physical (PHY) selection unit 105, and a carrier sense control unit 106. The LLC processing unit 101, the LLC interface (LLC-IF) 102, the MAC processing unit 103, the network interfaces (NW-IF) 104A, 104B, and 104C, physical (PHY) selection unit 105, and the carrier sense control unit 106 are implemented by, for example, the processor 11, the wireless module 16, and the wired module 17.

The LLC processing unit 101 performs LLC layer processing on data transferred from a server on the network 40, for example, and generates LLC packets. The LLC layer processing includes, for example, processing for adding a Destination Service Access Point (DSAP) header, a Source Service Access Point (SSAP) header, and the like to the data. The LLC processing unit 101 also extracts data from the LLC packets and outputs the extracted data to a higher layer. The higher layer is, for example, the application layer.

The LLC-IF 102 is an interface for mediating signals between the LLC processing unit 101 and the MAC processing unit 103. The LLC-IF 102 has a queue, for example. This queue temporarily stores the LLC packets generated by the LLC processing unit 101. This queue also temporarily stores LLC packets extracted from the MAC frames by the MAC processing unit 103.

When transmitting data from the first base station 10, the MAC processing unit 103 generates MAC frames from LLC packets input via the LLC-IF 102. The generation of the MAC frames is performed according to the processing of step S10 to step S15 illustrated in FIG. 5. The MAC processing unit 103 also extracts the LLC packets by performing processing based on the MAC headers of the MAC frames input from the NW-IFs 104A, 104B, and 104C, and outputs the extracted LLC packets to the LLC-IF 102. The extraction of the LLC packets from the MAC frames is performed according to the processing of step S22 to step S25 illustrated in FIG. 5. Note that the MAC processing unit 103 may have a queue for each of access categories (AC). Access categories may include, for example, VO (Voice), VI (Video), BE (Best effort), and BK (Background).

The NW-IF 104A performs processing necessary for communicating signals between the first base station 10 and the second base station 20A. The NW-IF 104B performs processing necessary for communicating signals between the first base station 10 and the second base station 20B. The NW-IF 104C performs processing necessary for communicating signals between the first base station 10 and the second base station 20C. Each of the NW-IFs 104A, 104B, and 104C has a queue, for example. These queues temporarily store the signals (MAC frames) generated by the MAC processing unit 103. These queues also temporarily store signals transmitted from the second base stations 20A, 20B, and 20C, respectively. The NW-IFs 104A, 104B, and 104C perform processing according to the respective communication methods thereof. For example, if the communication method is ROF, the NW-IFs 104A, 104B, and 104C convert electrical signals into optical signals through EO conversion (electrical-to-optical conversion) and transmit the optical signals to the desired base stations among the second base stations 20A, 20B, and 20C. Additionally, the NW-IFs 104A, 104B, and 104C convert optical signals from the second base stations 20A, 20B, and 20C into electrical signals through OE (optical-to-electrical conversion) and output the electrical signals to the MAC processing unit 103. Additionally, the NW-IFs 104A, 104B, and 104C output information for performing carrier sensing, from the corresponding second base stations, to the carrier sense control unit 106.

The PHY selection unit 105 selects one of the second base stations 20A, 20B, and 20C as the base station to use for communication with the terminal 30 in accordance with information, obtained by the carrier sense control unit 106, for performing carrier sensing from the second base stations 20A, 20B, and 20C. The selection by the PHY selection unit 105 will be described in detail later.

The carrier sense control unit 106 performs various types of control for Enhanced Distribution Channel Access (EDCA). For example, the carrier sense control unit 106 determines the state of channels between the second base stations 20A, 20B, and 20C and the terminal using Carrier Sense Multiple Access with Collision Avoidance (CSMA/CA). The state of the channels is determined on the basis of information for carrying out carrier sensing, obtained via the NW-IFs 104A, 104B, and 104C. The carrier sense control unit 106 then outputs the result of determining the state of the channels to the PHY selection unit 105. Here, the carrier sense control unit 106 may have access parameters for each AC.

Figure 7:
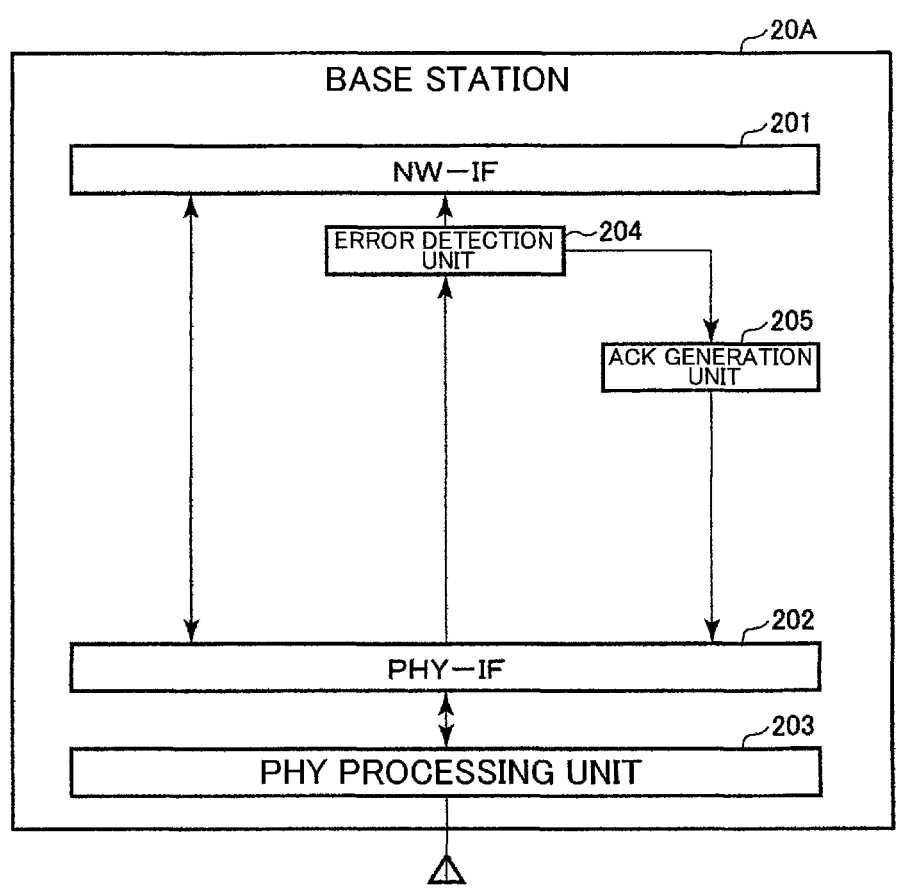
FIG. 7 is a function block diagram of the second base station.

FIG. 7 is a function block diagram of the second base station 20A. The second base stations 20B and 20C may have the same functions as the second base station 20A. The following assumes that the functions of the second base stations 20B and 20C are the same as those of the second base station 20A, and thus the functions of the second base stations 20B and 20C will not be described.

The second base station 20A includes a network interface (NW-IF) 201, a physical interface (PHY-IF) 202, a physical (PHY) processing unit 203, an error detection unit 204, and an ACK generation unit 205.

The NW-IF 201 performs processing necessary for communication between the second base station 20A and the first base station 10. The NW-IF 201 has a queue. This queue temporarily stores signals (MAC frames) transmitted by the first base station 10. The queue also temporarily stores signals output from the error detection unit 204. The NW-IF 201 performs processing according to the communication method. For example, if the communication method is ROF, the NW-IF 201 converts electrical signals from the PHY-IF 202 into optical signals through. EO conversion and transmits the optical signals to the first base station 10. Additionally, the NW-IF 201 converts optical signals from the first base station 10 into electrical signals through OE conversion and outputs the electrical signals to the PHY-IF 202. Additionally, the NW-IF 201 sequentially transmits information for performing carrier sensing, sent from the PHY processing unit 203 via the PHY-IF 202, to the first base station 10.

The PHY-IF 202 is an interface for mediating communication between the NW-IF 201 and the PHY processing unit 203, mediating signals between the PHY processing unit 203 and the error detection unit 204, and mediating signals between the PHY processing unit 203 and the ACK generation unit 205. The PHY-IF 202 has a queue, for example. This queue temporarily stores the signals (MAC frames) temporarily stored in the NW-IF 201. Signals extracted by the PHY processing unit 203 are also temporarily stored.

The PHY processing unit 203 primarily performs physical layer processing for wireless LAN communication with the terminal 30. For example, the PHY processing unit 203 performs physical layer processing on the MAC frames stored in the PHY-IF 202 to convert the MAC frames into a wireless signal, and transmits the wireless signal to the terminal 30. The PHY processing unit 203 also measures information necessary for performing carrier sensing, and communicates that information to the first base station 10. The carrier sensing may be performed using Clear Channel Assessment (CCA), for example. CCA is a method for determining whether or not a channel is clear based on the reception power (RSSI) of the PHY processing unit 203. In this case, the PHY processing unit 203 measures the RSSI. As described earlier, the information necessary for performing carrier sensing is sent to the carrier sense control unit 106 of the first base station 10. Additionally, the PHY processing unit 203 extracts the MAC frames from the wireless signal received from the terminal 30 and outputs the MAC frames to the PHY-IF 202. The PHY processing unit 203 also broadcasts beacon frames. The MAC address included in the beacon frames is a MAC address used in common by the first base station 10 and the second base stations 20A, 20B, and 20C.

The error detection unit 204 detects errors in the MAC frames in order to determine whether or not the data transmitted from the terminal 30 has been received correctly. The error detection is performed using FCS. The error detection may be carried out in units of MPDUs. When there is no error in a MAC frame, the error detection unit 204 outputs the MAC frame to the NW-IF 201, and requests the ACK generation unit 205 to generate an acknowledge (ACK) indicating that the reception has been performed normally. On the other hand, when there is an error in a MAC frame, the error detection unit 204 discards the MAC frame.

The ACK generation unit 205 generates the ACK in response to the request from the error detection unit 204, and outputs the generated ACK to the PHY processing unit 203 via the PHY-IF 202. In this case, the PHY processing unit 203 transmits the ACK to the terminal 30. Here, the ACK may be a block ACK. A block ACK is, for example, an ACK for a reception confirmation response in units of MPDUs. In this case, the block ACK is generated on the basis of a bitmap created by the error detection unit 204 in accordance with the result of error detection on each of the data in units of MPDUs included in the MAC frame.

Operations of the communication system 1 will be described next. First, operations performed when a base station (the first base station 10, the second base stations 20A, 20B, and 20C) transmit a wireless signal and the terminal 30 receives the wireless signal will be described.

Figure 8:
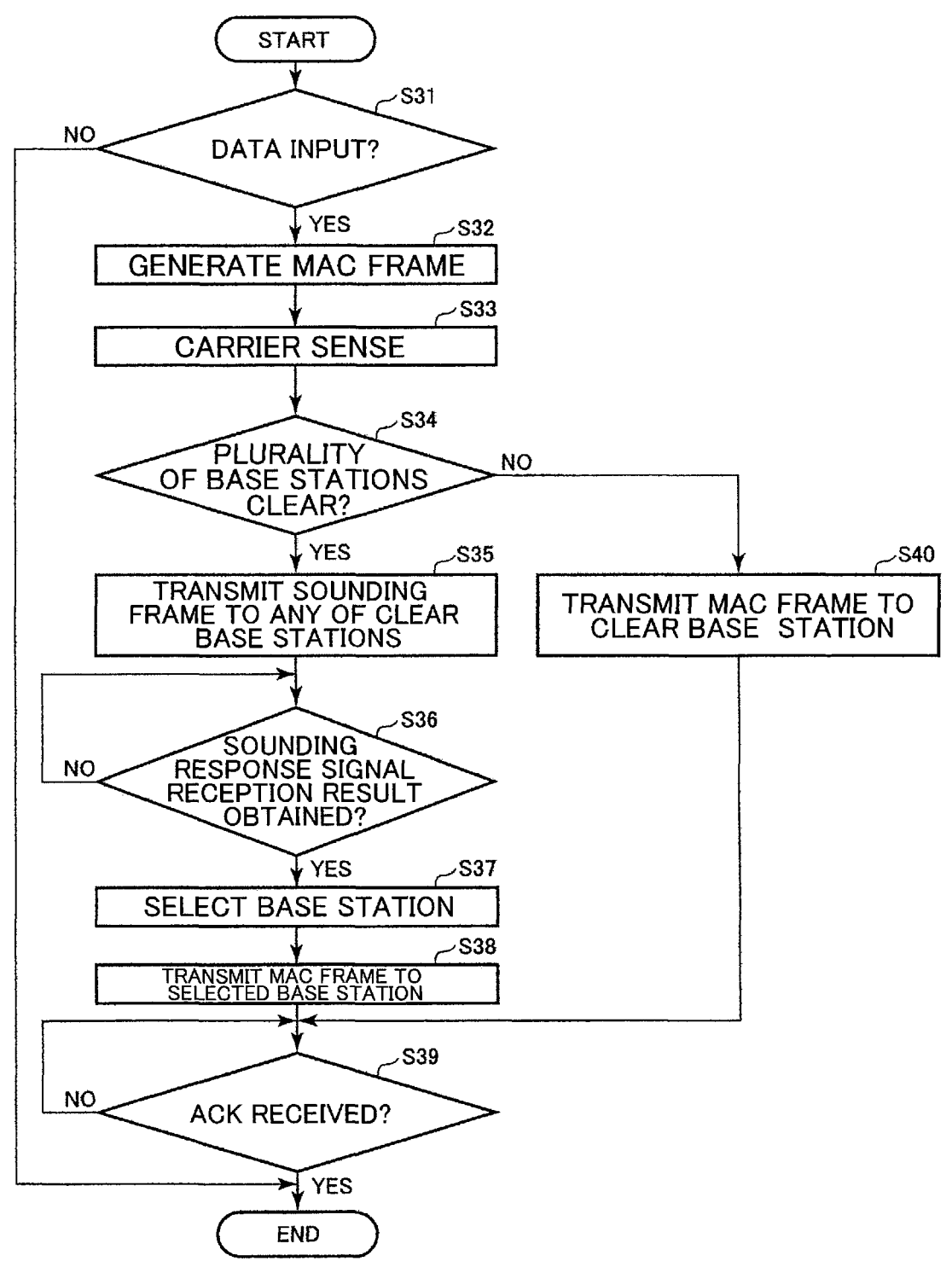
FIG. 8 is a flowchart illustrating an example of transmission processing by the first base station.

FIG. 8 is a flowchart illustrating an example of transmission processing by the first base station 10. In step S31, the MAC processing unit 103 determines whether or not data to be transmitted via the LLC processing unit 101 and the LLC-IF 102 has been input from a higher layer such as the application layer. When it is determined in step S31 that no data has been input, the processing of FIG. 8 ends. When it is determined in step S31 that data has been input, the processing moves to step S32.

In step S32, the MAC processing unit 103 performs MAC layer processing illustrated in FIG. 5 on the input data (LLC packets) to generate a MAC frame.

In step S33, the carrier sense control unit 106 determines a clear channel on the basis of the RSSI input from the second base stations 20A, 20B, and 20C via the NW-IFs 104A, 104B, and 104C.

In step S34, the carrier sense control unit 106 determines whether or not the channels of a plurality of base stations among the second base stations 20A, 20B, and 20C are clear on the basis of a result of the carrier sensing. For example, the carrier sense control unit 106 determines that the channel of a corresponding base station is clear when the reception power at the PHY processing unit has dropped below a threshold over a carrier sense period that adds a random backoff period to an Arbitration Inter Frame Space (AIFS). Here, AIFS is an access parameter indicating a transmission interval of the wireless signals. In other words, in the embodiment, the access parameters are common across the second base stations 20A, 20B, and 20C. When it is determined in step S34 that the channels of a plurality of base stations are clear, the processing moves to step S35. When it is determined in step S34 that only the channel of a single base station is clear, the carrier sense control unit 106 notifies the PHY selection unit 105 of, for example, an ID of the base station for which the channel is clear. The PHY selection unit 105 notifies the MAC processing unit 103 of this ID as a selection result. The processing then moves to step S40. Note that in step S34, it is possible that channels of all the base stations are determined not to be clear. In this case, the carrier sense control unit 106 may suspend the processing.

In step S35, the carrier sense control unit 106 transmits a sounding frame via the NW-IF corresponding to any base station, among the second base stations 20A, 20B, and 20C, for which the channel is clear. Note that the sounding frame need not be transmitted when the second base station to be used is associated with the terminal serving as the transmission destination. For example, if the carrier sense control unit 106 or the PHY selection unit 105 holds the reception power from the terminal 30 for each of the second base stations, when it is determined that channels are clear for a plurality of the base stations, the base station having the highest reception power can be selected.

In step S36, the carrier sense control unit 106 determines whether or not sounding response signal reception results have been obtained from the NW-IFs, among the NW-IFs 104A, 104B, and 104C, that correspond to base stations having a channel that is clear. These reception results are the reception powers of the sounding response signal. When it is determined in step S36 that sounding response signal reception results have not been obtained, the carrier sense control unit 106 suspends the processing. When it is determined in step S36 that sounding response signal reception results have been obtained, the carrier sense control unit 106 outputs those reception results to the PHY selection unit 105. The processing then moves to step S37.

In step S37, the PHY selection unit 105 selects a base station to be used to transmit data to the terminal 30 in accordance with the sounding response signal reception results. For example, the PHY selection unit 105 selects the base station having the highest reception power for the sounding response signal. After the selection, the PHY selection unit 105 notifies the MAC processing unit 103 of, for example, the ID of the selected base station as a selection result.

In step S38, the MAC processing unit 103 transmits the MAC frame using the NW-IF corresponding to the selected base station.

In step S39, the MAC processing unit 103 determines whether or not an ACK has been received. If it is determined in step S39 that an ACK has been received, the processing of FIG. 8 ends. If it is determined in step S39 that an ACK has not been received, the MAC processing unit 103 suspends the processing. A time over determination may be made if it is determined that an ACK has not been received for a predetermined amount of time. In this case, the MAC processing unit 103 may retransmit the MAC frame. Additionally, the MAC processing unit 103 may retransmit the MAC frame by receiving a notification of transmission failure from the second base stations 20A, 20B, and 20C.

In step S40, the MAC processing unit 103 transmits the MAC frame using the NW-IF corresponding to the selected base station. The processing then moves to step S39.

Figure 9:
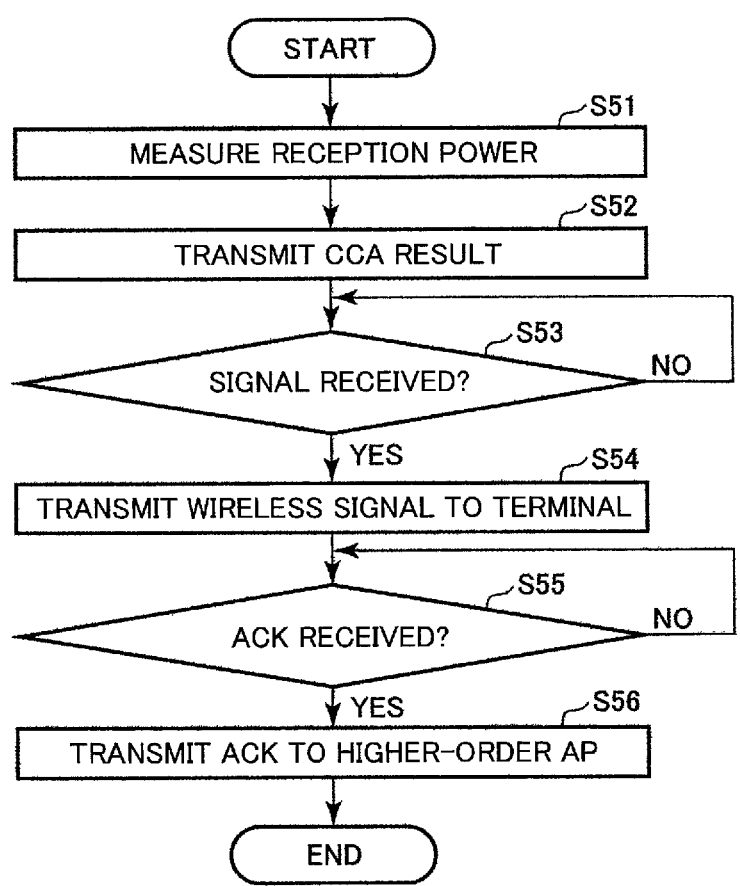
FIG. 9 is a flowchart illustrating an example of transmission processing by the second base station.

FIG. 9 is a flowchart illustrating an example of transmission processing by the second base station 20A. The second base stations 20B and 20C may perform the same processing as the second base station 20A. The following assumes that the operations of the second base stations 20B and 20C are the same as those of the second base station 20A, and thus the operations of the second base stations 20B and 20C will not be described.

In step S51, the PHY processing unit 203 obtains information for performing carrier sensing. For example, the PHY processing unit 203 measures the RSSI for CCA.

In step S52, the PHY processing unit 203 transmits a CCA result to the first base station 10 using the NW-IF 201.

In step S53, the PHY processing unit 203 determines whether or not a signal such as a MAC frame has been input.

If it is determined in step S53 that a signal has not been input, the PHY processing unit 203 suspends the processing. If it is determined in step S53 that a signal has been input, the processing moves to step S54.

In step S54, the PHY processing unit 203 transmits a wireless signal. For example, when a MAC frame has been input, the PHY processing unit 203 performs physical layer processing on the MAC frame to convert the MAC frame into a wireless signal. The PHY processing unit 203 then transmits the wireless signal to the terminal 30. Additionally, when a sounding frame has been input, the PHY processing unit 203 performs physical layer processing to convert the sounding frame into a sounding signal, which is a wireless signal. The PHY processing unit 203 then transmits the sounding signal to the terminal 30. In this case, the PHY processing unit 203 waits to receive the sounding response signal, which includes a sounding response frame, from the terminal 30. Then, when the sounding response signal is received, the PHY processing unit 203 transmits the sounding response signal reception result to the first base station 10. The reception result is, for example, the reception power of the sounding response signal.

In step S55, the PHY processing unit 203 determines whether or not an ACK has been received from the terminal 30. If it is determined in step S55 that an ACK has been received from the terminal 30, the processing moves to step S56. If it is determined in step S55 that an ACK has not been received, the MAC processing unit 103 suspends the processing. A time over determination may be made if it is determined that an ACK has not been received for a predetermined amount of time. In this case, the MAC processing unit 103 may notify the first base station 10 that the transmission has failed.

In step S56, the PHY processing unit 203 transmits an ACK to the first base station 10 using the NW-IF 201. The processing of FIG. 9 then ends.

In this manner, when transmitting a wireless signal, the second base station 20A converts the MAC frame received from the first base station 10 into a wireless signal and transmits the wireless signal as-is to the terminal 30. The same applies to the second base stations 20B and 20C.

Figure 10:
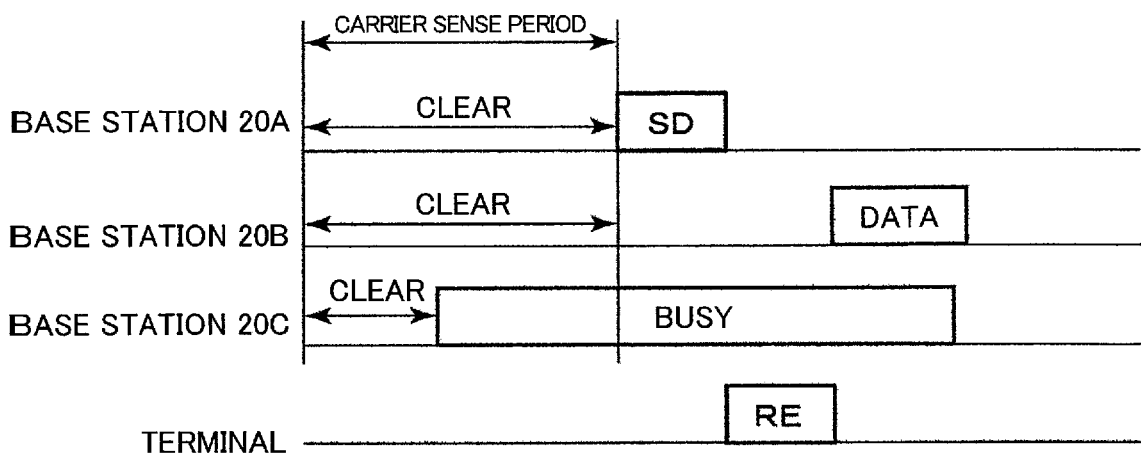
FIG. 10 is a timing chart illustrating changes over time in a state of PHY processing units of second base stations during the processing illustrated in FIG. 9.

The selection of a base station using the sounding signal will be described further hereinafter. FIG. 10 is a timing chart illustrating changes over time in a state of the PHY processing units of the second base stations 20A, 20B, and 20C during the processing illustrated in FIG. 9. In the example of FIG. 10, since the reception power of the PHY processing unit 203 in both the second base station 20A and the second base station 20B is below the threshold during the carrier sense period, the base stations are in a clear state. On the other hand, the second base station 20C is in a busy state during the carrier sense period.

In response to such a result, the carrier sense control unit 106 of the first base station 10 transmits a sounding frame. The base station that has received the sounding frame transmits a sounding signal to the terminal 30. In the example of FIG. 10, the second base station 20A transmits the sounding signal (SD) to the terminal 30.

Having received the sounding signal, the terminal 30 returns a sounding response signal (RE). The sounding response signal is received by both the second base station 20A and the second base station 20B. The PHY processing unit 203 of each of the second base station 20A and the second base station 20B measures the reception power as a sounding response signal reception result. Then, each PHY processing unit 203 transmits the reception power as a sounding response signal reception result to the first base station 10. The first base station 10 selects a base station to be used to transmit data on the basis of the respective sounding signal reception results of the second base station 20A and the second base station 20B. In the example in FIG. 10, the second base station 20B. Accordingly, the second base station 20B transmits a wireless signal including data to the terminal 30.

In this manner, in this embodiment, if the channels of a plurality of second base stations are clear when transmitting data from a base station, the second base station having the best communication state is selected as the base station for transmitting the data.

Operations performed when the terminal 30 transmits data and the base stations (the first base station 10, the second base stations 20A, 20B, and 20C) receive the data will be described next. Here, the terminal 30 specifies the MAC address used in common by the first base station 10 and the second base stations 20A, 20B, and 20C as the destination MAC address when transmitting the wireless signal. The transmission of the data by the terminal 30 is performed using the same EDCA as the base station, for example. The operations through which the terminal 30 transmits the data will not be described in detail.

Figure 11:
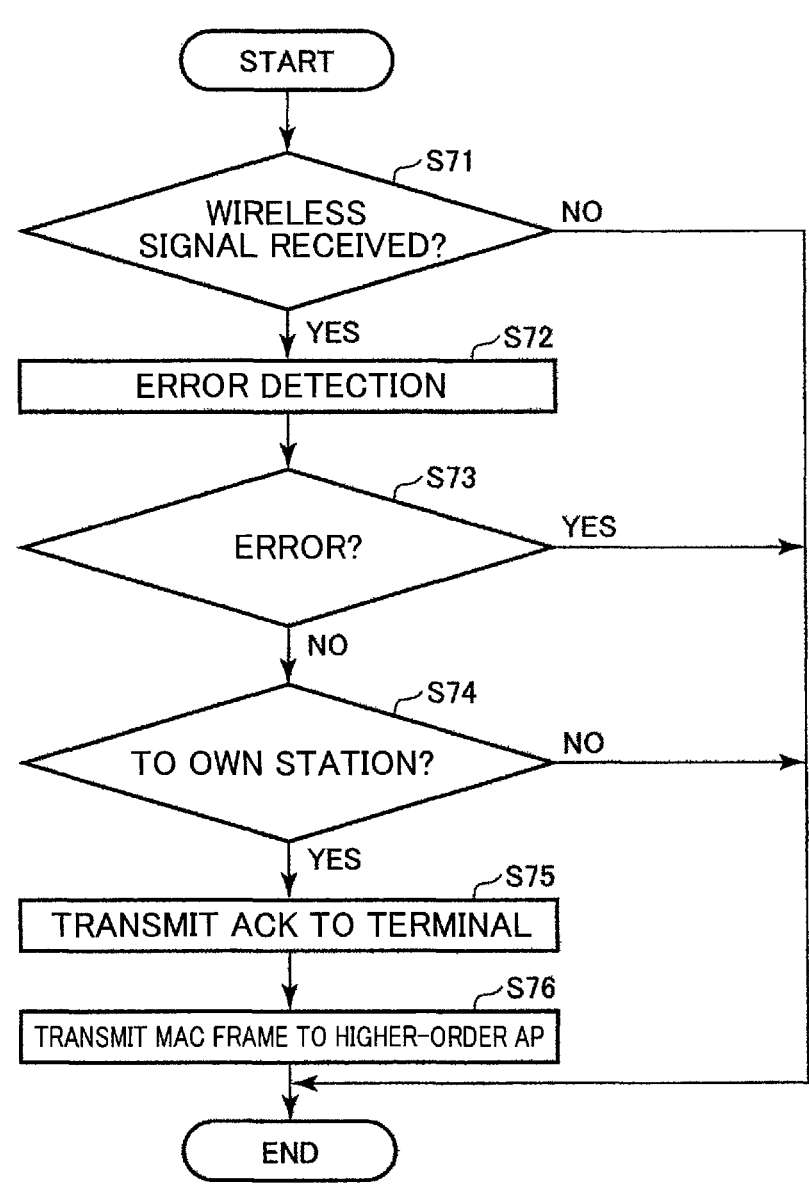
FIG. 11 is a flowchart illustrating an example of reception processing by the second base station.

FIG. 11 is a flowchart illustrating an example of reception processing by the second base station 20A. The second base stations 20B and 20C may perform the same processing as the second base station 20A. The following assumes that the operations of the second base stations 20B and 20C are the same as those of the second base station 20A, and thus the operations of the second base stations 20B and 20C will not be described.

In step S71, the PHY processing unit 203 determines whether or not a wireless signal has been received. If it is determined in step S71 that a wireless signal has not been received, the processing of FIG. 11 ends. If it is determined in step S71 that a wireless signal has been received, the processing moves to step S72.

In step S72, the PHY processing unit 203 performs physical layer processing to extract a MAC frame from the wireless signal. The error detection unit 204 then detects error on the basis of the FCS of the MAC frame.

In step S73, the error detection unit 204 determines whether or not there is an error in the data. If it is determined in step S73 that there are no errors in the data, the processing moves to step S74. If it is determined in step S73 that there is an error in the data, the error detection unit 204 discards the data. In this case, the processing of FIG. 11 ends. Note that when there is an error in the data, the error detection unit 204 may determine that the data is addressed to its own base station, and notify the first base station 10 that there is an error. This makes it possible for the first base station 10 to determine whether a retransmission request is necessary.

In step S74, the error detection unit 204 determines whether or not the received data is addressed to its own base station. In other words, the error detection unit 204 determines whether or not the MAC address is an address used in common for the first base station 10 and the second base stations 20A, 20B, and 20C. If it is determined in step S74 that the received data is addressed to its own base station, the processing moves to step S75. If it is determined in step S74 that the received data is not addressed to its own base station, the error detection unit 204 discards the data. In this case, the processing of FIG. 11 ends.

In step S75, the error detection unit 204 instructs the ACK generation unit 205 to generate an ACK. In response, the ACK generation unit 205 generates the ACK, and transmits the ACK to the terminal 30 using the PHY processing unit 203.

In step S76, the error detection unit 204 transmits the MAC frame to the first base station 10 using the NW-IF 201. The processing of FIG. 11 then ends.

In this manner, if, when a wireless signal is received, the data can be received without errors and the data is addressed to the base station itself, the second base station 20A transmits the MAC frame as-is to the first base station 10. The same applies to the second base stations 20B and 20C.

Figure 12:
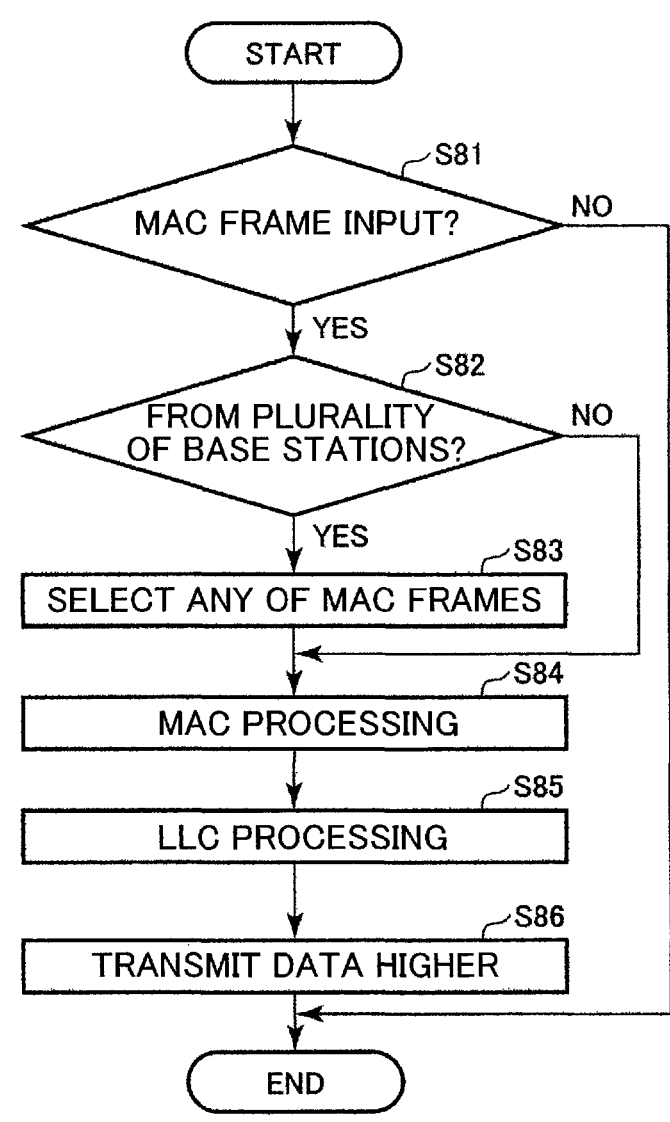
FIG. 12 is a flowchart illustrating an example of reception processing by the first base station.

FIG. 12 is a flowchart illustrating an example of reception processing by the first base station 10. In step S81, the MAC processing unit 103 determines whether or not a MAC frame has been input via at least one of the NW-IFs 104A, 104B, and 104C. When it is determined in step S81 that no MAC frame has been input, the processing of FIG. 12 ends. When it is determined in step S81 that a MAC frame has been input, the processing moves to step S82.

In step S82, the MAC processing unit 103 determines whether or not a plurality of MAC frames have been input. When there are overlapping areas in the service areas of the second base stations 20A, 20B, and 20C, a wireless signal may be received by the plurality of base stations at the same time or with a time difference. In this case, the same MAC frame is sent to the MAC processing unit 103 from the plurality of base stations. Step S82 is a determination of this state. When it is determined in step S82 that a plurality of MAC frames have been input, the processing moves to step S83. When it is determined in step S82 that a plurality of MAC frames have not been input, the processing moves to step S84. Note that when a notification that the data received from the second base stations 20A, 20B, and 20C has an error has been made, a retransmission request may be made as necessary.

In step S83, the MAC processing unit 103 selects one of the MAC frames. For example, the MAC processing unit 103 selects the MAC frame from the base station received at the highest reception power. Because the same MAC frame is transmitted from each base station, the MAC processing unit 103 may select the MAC frames in a predetermined priority order, such as the order of the second base stations 20A, 20B, and 20C. Note that in order to avoid a situation in which a plurality of second base stations transmit the ACK simultaneously, a second base station that is primary may be set for each terminal, and the second base stations may transmit the ACK when reception has succeeded, the destination is itself, and the transmission source is the terminal for which the second base station itself is primary. Which second base station is to be primary may be the second base station having the highest reception power from the terminal.

In step S84, the MAC processing unit 103 performs the MAC layer processing illustrated in FIG. 5 to extract the LLC packet. The MAC processing unit 103 then outputs the extracted LLC packet to the LLC processing unit 101.

In step S85, the LLC processing unit 101 extracts the data from the LLC packet.

In step S86, the LLC processing unit 101 outputs the extracted data to the higher layer. The higher layer is, for example, the application layer. The processing of FIG. 12 then ends.

According to the embodiment described thus far, the MAC layer processing of one or more second base station is performed collectively by a single first base station. This makes it possible to consider the first base station and the one or more second base stations as a single base station.

Accordingly, it is not necessary to switch the connection at the time of a handover when the terminal 30 moves from the service area of the second base station 20A to the service area of the second base station 20B, for example. This makes it possible to reduce overhead arising from the switching of connections at the time of a handover. In the embodiment, the service area can be broadened substantially by increasing the number of second base stations that are installed.

Each second base station also performs error detection for the received MAC frames. This makes it possible to support protocols having stricter time limits than when the error detection is performed by the first base station.

Furthermore, when the channels of the plurality of second base stations are clear, a single second base station for transmitting the wireless signal is selected in accordance with a result of sounding, for example. As a result, communication with a terminal can be performed using the base station that has the channel in the best state.

Additionally, communication between the first base station and the second base stations is performed through wired communication. This makes it easier to stabilize the communication between the first base station and the second base stations.

Variations

Variations on the embodiment will be described next. In the embodiment, the first base station is not provided with a PHY processing unit. In other words, in the embodiment, the first base station does not perform wireless communication with the terminal directly. As opposed to this, the first base station may also include a PHY processing unit.

The embodiment also describes an example in which a single second base station is provided with a single PHY processing unit. However, a plurality of different PHY processing units, e.g., a PHY processing unit for the 2.4 GHz band and a PHY processing unit for the 5 GHz band, may be provided in a single second base station. In this case, carrier sensing may be performed for each of the PHY processing units. The PHY selection unit 105 may then select a single PHY processing unit on the basis of the CCA result obtained for each PHY processing unit.

Additionally, in the embodiment, the error detection is performed by the second base stations. However, the error detection may be performed by the first base station. In this case, the error detection unit of the first base station detects errors in the data received by each of the three second base stations. The error detection unit then transmits a block ACK based on the error in the data from a single second base station.

Each of the processes in the above-described embodiment can be stored as a program which can be executed by a processor serving as a computer. The programs can be stored in a storage medium of an external storage device such as a magnetic disk, an optical disk, semiconductor memory, or the like. The processor can then load the programs stored in the storage medium of the external storage device and execute the above-described processing by controlling the operations by the loaded programs.

Note that the present invention is not limited to the above embodiments, and can be modified in various ways without departing from the scope thereof at the implementation stage. In addition, embodiments may be combined as appropriate, in which case combined effects can be achieved. Furthermore, the foregoing embodiments include various inventions, and various inventions can be extracted by selecting combinations of the multiple constituent elements disclosed herein. For example, even if several of the constituent elements described in the embodiments are removed, a configuration in which those constituent elements have been removed can be extracted as an invention as long as the problem can be solved and the effect can be achieved.

REFERENCE SIGNS LIST

1 Communication system
10 First base station
11 Processor
12 ROM
13 RAM
14 WAN module
15 Routing module
16 Wireless module
17 Wired module
20A, 20B, 20C Second base station
21 Processor
22 ROM
23 RAM
24 Wireless module
25 Wired module
30 Terminal
31 Processor
32 ROM
33 RAM
34 Wireless module
35 Display
36 Storage
40 Network
101 LLC processing unit
102 LLC-IF
103 MAC processing unit
104A, 104B, 104C NW-IF
105 PHY selection unit
106 Carrier sense control unit
201 NW-IF
202 PHY-IF
203 PHY processing unit
204 Error detection unit
205 ACK generation unit

The invention claimed is:

1. A base station that, in a base station system including a first base station and at least two second base stations, functions as the first base station, the first base station comprising:

a processor that performs MAC layer processing and generates a first MAC frame used in common between the first base station and the second base stations; and a communication processing circuit that transmits the first MAC frame to the second base stations, wherein the processor further, on the basis of information for performing carrier sensing from each of the second base stations, selects one of the second base stations that is a transmission destination of the first MAC frame, wherein when the information for performing carrier sensing indicates there is a clear channel in only one of the second base stations, the processor selects the one of the second base stations having a clear channel; and when the information for performing carrier sensing indicates there is a clear channel in at least two of the second base stations, the processor transmits a sounding frame to at least one of the at least two of the second base stations having a clear channel and causes a sounding frame to be transmitted from at least one of the at least two of the second base stations to a terminal, receives, from the at least two of the second base stations, a reception result of a sounding response frame from the terminal, and selects one of the second base stations on the basis of the reception result of the sounding response frame received.

2. The base station according to claim 1, wherein the communication processing circuit further receives, from the second base stations, a second MAC frame, the second MAC frame being a MAC frame transmitted from a terminal to the second base stations and including a MAC address used in common by the first base station and the second base stations, and the processor performs MAC layer processing on the second MAC frame and extracts data from the second MAC frame.

3. The base station according to claim 1, the processor, on the basis of information for performing carrier sensing from each of the second base stations, determines whether a channel of each of the second base stations is clear, using access parameters common among the second base stations.

4. The base station according to claim 1, wherein the communication processing circuit transmits the first MAC frame to the second base stations over a wire.

5. A base station that, in a base station system including a first base station and at least two second base stations, functions as one of the second base stations, the base station comprising:

a communication processing circuit that receives a first MAC frame from the first base station; and a processor that performs physical layer processing and generates a wireless signal including the first MAC frame, and transmits the wireless signal generated to a terminal, wherein the processor further, on the basis of information for performing carrier sensing from each of the second base stations, selects one of the second base stations that is a transmission destination of the first MAC frame, wherein when the information for performing carrier sensing indicates there is a clear channel in only one of the second base stations, the processor selects the one of the second base stations having a clear channel; and when the information for performing carrier sensing indicates there is a clear channel in at least two of the second base stations, the processor transmits a sounding frame to at least one of the at least two of the second base stations having a clear channel and causes a sounding frame to be transmitted from at least one of the at least two of the second base stations to the terminal, receives, from the at least two of the second base stations, a reception result of a sounding response frame from the terminal, and selects one of the second base stations on the basis of the reception result of the sounding response frame received.

6. The base station according to claim 5, wherein the processor further receives a wireless signal including a second MAC frame that includes a MAC address used in common among the first base station and the second base stations, performs physical layer processing on the wireless signal received, and extracts the second MAC frame from the wireless signal, and detects whether or not there is an error in the reception of the second MAC frame; and generates an acknowledge in accordance with a result of whether or not there is an error, and transmits the acknowledge generated to the terminal via the communication processing circuit.

7. A base station system comprising a first base station and at least two second base stations, wherein the first base station includes:

a first processor that performs MAC layer processing and generates a first MAC frame used in common between the first base station and the second base stations; and a first communication processing circuit that transmits the first MAC frame to the second base stations, and one the at least two second base stations includes:

a second communication processing circuit that receives the first MAC frame from the first base station; and a second processor that performs physical layer processing and generates a wireless signal including the first MAC frame, and transmits the wireless signal generated to a terminal, wherein the first processor further, on the basis of information for performing carrier sensing from each of the at least two second base stations, selects the one of the at least two second base stations as a transmission destination of the first MAC frame, wherein when the information for performing carrier sensing indicates there is a clear channel in only one of the second base stations, the first processor selects the one of the second base stations having a clear channel; and when the information for performing carrier sensing indicates there is a clear channel in at least two of the second base stations, the first processor transmits a sounding frame to at least one of the at least two of the second base stations having a clear channel and causes a sounding frame to be transmitted from at least one of the at least two of the second base stations to the terminal, receives, from the at least two of the second base stations, a reception result of a sounding response frame from the terminal, and selects one of the second base stations on the basis of the reception result of the sounding response frame received.

8. A communication method in a base station system comprising a first base station and at least two second base stations, the communication method comprising:

in the first base station, performing MAC layer processing and generating a first MAC frame used in common between the first base station and the second base stations;

on the basis of information for performing carrier sensing from each of the at least two second base stations, in the first base station, selecting one of the at least two second base stations as a transmission destination of the first MAC frame;

transmitting the first MAC frame from the first base station to the second base stations;

in the second base stations, receiving the first MAC frame from the first base station;

in the second base stations, performing physical layer processing and generating a wireless signal including the first MAC frame; and transmitting the wireless signal to a terminal, wherein when the information for performing carrier sensing indicates there is a clear channel in only one of the second base stations, selecting the one of the second base stations having a clear channel; and when the information for performing carrier sensing indicates there is a clear channel in at least two of the second base stations, transmitting a sounding frame to at least one of the at least two of the second base stations having a clear channel and causes a sounding frame to be transmitted from at least one of the at least two of the second base stations to the terminal, receives, from the at least two of the second base stations, a reception result of a sounding response frame from the terminal, and selecting one of the second base stations on the basis of the reception result of the sounding response frame received.

* * * * *